G. H. HUNT.
AUTOMOBILE STORM AWNING.
APPLICATION FILED JAN. 17, 1918.
1,272,958.
Patented July 16, 1918.
2 SHEETS—SHEET 1.
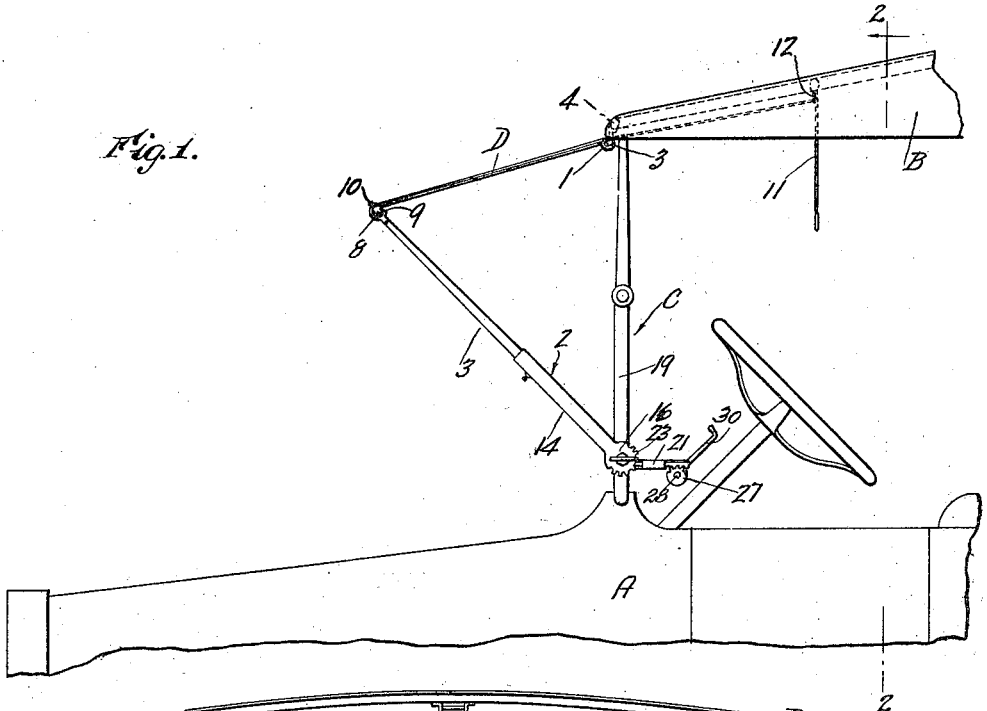
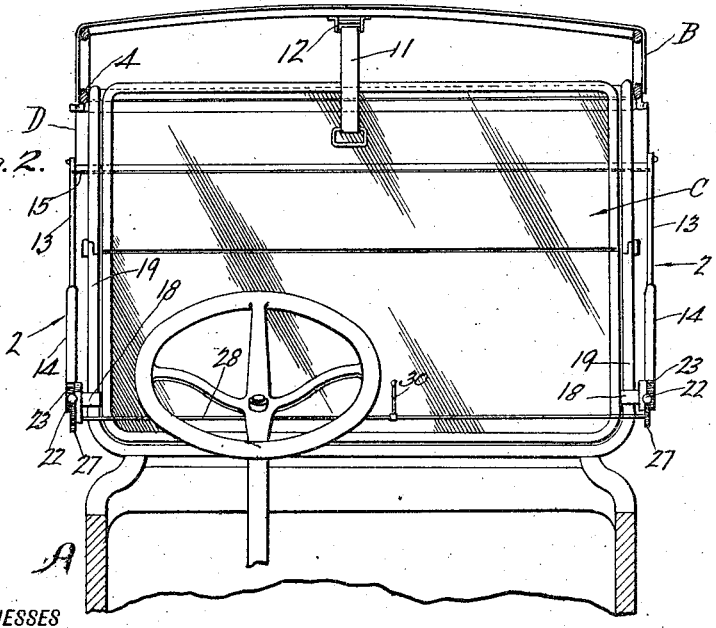
WITNESSES
INVENTOR
G. H. Hunt
BY
ATTORNEYS

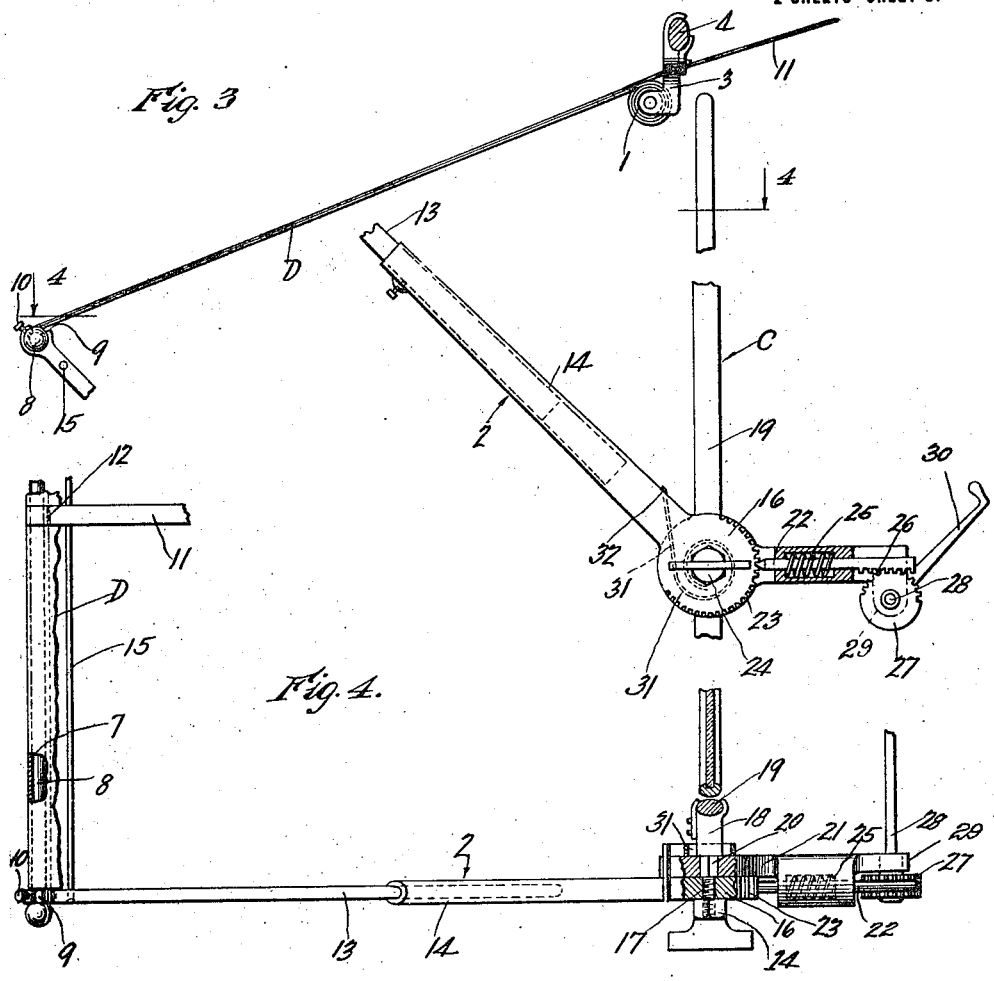

UNITED STATES PATENT OFFICE.

GEORGE H. HUNT, OF MONROE CENTER, ILLINOIS.

AUTOMOBILE STORM-AWNING.

1,272,958. Specification of Letters Patent. Patented July 16, 1918.

Application filed January 17, 1918. Serial No. 212,267.

*To all whom it may concern:*

Be it known that I, GEORGE H. HUNT, a citizen of the United States, and a resident of Monroe Center, in the county of Ogle and State of Illinois, have invented a new and Improved Automobile Storm-Awning, of which the following is a full, clear, and exact description.

This invention relates to a storm awning adapted to be used in connection with the top of an automobile to protect the upper part of the wind-shield from rain, snow or sleet so that the vision of the driver will not be obscured, and also for shutting out rays from the sun or elevated street lights.

The invention has for its general objects to provide an awning attachment of the class referred to which is of comparatively simple and inexpensive construction, reliable and efficient in use, and so designed that it can be applied to a wind-shield and automobile top in such a manner as to be of pleasing and attractive appearance and easily managed, so that the top can be put up or down without interference.

A more specific object of the invention is the provision of a waterproof flexible awning which can be operated from within the automobile both in raising and lowering the awning, there being spring-actuated arms mounted on the side of the wind-shield to forwardly project or open the awning, which latter includes a spring-actuated roller, so that when the supporting arms of the awning are drawn back the awning will automatically wind up.

Still another object of the invention is the provision of a novel and effective locking means for holding the supporting arms in either open or closed position, and also simple, novel and effective means for detachably attaching the awning to the supporting arms.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the front portion of an automobile, showing the invention applied thereto;

Fig. 2 is a vertical section on the line 2—2, Fig. 1;

Fig. 3 is an enlarged sectional view with intermediate portions of the wind-shield and side arms broken away;

Fig. 4 is a fragmentary sectional view taken on the line 4—4, Fig. 3; and

Fig. 5 is an enlarged sectional view of one end of the roller for the awning.

Referring to the drawing, A designates the body of an automobile, B the top thereof and C the wind-shield.

The awning D is carried by a self-winding roller 1 located at the top of the wind-shield C, and under the cover B, and the awning when in open position is supported by side arms 2 pivotally mounted on the sides of the wind-shield C.

The roller 1 is mounted in a pair of brackets 3 attached to the front bar 4 of the automobile top B. One end of the roller has a self-winding spring which is of usual construction and therefore is not shown. The opposite end, as shown in Fig. 5, is provided with a cap 5 having a journal 6, the cap being adjustable axially to lengthen or shorten the roller as required. The awning and roller are always carried by the top and are not detached when the top is lowered. The outer end of the awning D has an open hem 7, as shown in Fig. 4, and through this extends a rod 8, the ends of which project beyond the side edges of the awning and are removably engaged in sockets 9 in the side arms 2, and the rod is held in the sockets by set-screws 10. When the top is to be folded the awning is detached from the side arms 2 by disengaging the cross bar 8 from the sockets 9. A pull strap 11 has one end 12 attached to the forward edge of the awning and extends backwardly over the awning, over the roller and through a suitable guide 12 carried by the under side of the automobile top, the rear end of this pull strap being disposed adjacent the driver, so that by pulling rearwardly on the strap the awning can be drawn backwardly or closed, the roller winding the awning up as the free edge is drawn backwardly by the strap. So as not to be in the way the rear end of the strap is engaged with a hook or equivalent device (not shown) on the cover B.

The side arms 2, preferably made of telescoping sections 13 and 14, are permanently connected together by a cross rod 15 adjacent the outer ends of the arms. The inner end of each section 14 terminates in circular plate or hub 16 which swings on a pivot or journal 17 formed on a clip 18 which is clamped to the side bar 19 of the windshield and extends horizontally therefrom. The member 18 has a non-circular portion 20 on which is fitted a rearwardly extending bracket 21 which carries a reciprocatory pawl 22 engageable with the peripheral teeth 23 in the circular plate 16 of the arm 2, whereby the awning-supporting arms 2 can be held in any desired position of adjustment. On the journal 17 is threaded a hand nut 24, whereby the arms 2 can be rigidly clamped whenever desired. Each pawl 22 has a spring 25 for urging it into engagement with the teeth 23, and the rear end of each pawl has rack teeth 26 meshing with a pinion 27, the pinions being mounted on a horizontal rock shaft 28 journaled in bearings 29 formed on or carried by the bracket 21, and on this shaft is an operating lever or arm 30 which the driver presses downwardly to withdraw the pawls 22, so that the arms 2 can move outwardly to the open position of the awning, and also to permit the awning to be drawn closed. The rock shaft 28 may, if desired, be operated by a suitably arranged pedal. To assist in the forward swing of the arms 2 a coiled spring 31 is mounted at the supports 18 and engaged with the arms 2 at points 32 so as to exert a forward force on the latter. It will thus be seen that the arms can be projected by the combined action of gravity and spring pressure.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of an automobile top, a wind shield, an awning projectable forwardly from the said top, arms supporting the free edge of the awning, brackets secured to the wind shield and on which the arms are pivoted, means for locking the arms in different positions, and actuating means extending from one bracket to the other and operatively connected with the said means for simultaneously operating the latter.

2. The combination of an automobile top, a wind-shield, an awning projectable forwardly from the top, pivoted arms on the wind-shield to support the awning, springs for moving the arms in one direction, teeth on the pivoted ends of the arms, spring-actuated pawls engaging the teeth for preventing movement of the arms, and means for simultaneously releasing the pawls.

3. The combination of an automobile top, a wind-shield, an awning projectable forwardly from the top, pivoted arms on the wind-shield to support the awning, springs for moving the arms in one direction, teeth on the pivoted ends of the arms, spring-actuated pawls engaging the teeth for preventing movement of the arms, a rock shaft mounted adjacent the wind-shield, means for actuating the rock shaft, and connections between the rock shaft and pawls for moving the latter to and from releasing position.

GEORGE H. HUNT.